US011112571B2

(12) United States Patent
Sekino et al.

(10) Patent No.: US 11,112,571 B2
(45) Date of Patent: Sep. 7, 2021

(54) OPTICAL SUBASSEMBLY

(71) Applicant: Lumentum Japan, Inc., Kanagawa (JP)

(72) Inventors: Yuji Sekino, Kanagawa (JP); Akira Nakanishi, Tokyo (JP); Takayuki Nakajima, Tokyo (JP)

(73) Assignee: Lumentum Japan, Inc., Kanagawa (JP)

( * ) Notice: Subject to any disclaimer, the term of this patent is extended or adjusted under 35 U.S.C. 154(b) by 0 days.

(21) Appl. No.: 16/559,198

(22) Filed: Sep. 3, 2019

(65) Prior Publication Data

US 2021/0048588 A1   Feb. 18, 2021

(30) Foreign Application Priority Data

Aug. 13, 2019 (JP) .............................. JP2019-148457

(51) Int. Cl.
*G02B 6/42* (2006.01)
*H04B 10/50* (2013.01)

(52) U.S. Cl.
CPC ......... *G02B 6/4257* (2013.01); *G02B 6/4206* (2013.01); *G02B 6/4246* (2013.01)

(58) Field of Classification Search
CPC ..... G02B 6/4257; G02B 6/4274; G02B 6/426
See application file for complete search history.

(56) References Cited

U.S. PATENT DOCUMENTS

| 9,134,494 | B2 * | 9/2015 | Wang | G02B 6/29325 |
| 2001/0036337 | A1 * | 11/2001 | Kishida | G02B 6/4274 |
| | | | | 385/49 |
| 2011/0064358 | A1 * | 3/2011 | Nishimura | G02B 6/425 |
| | | | | 385/33 |
| 2014/0099121 | A1 * | 4/2014 | Shiraishi | H04B 10/40 |
| | | | | 398/115 |
| 2014/0215816 | A1 * | 8/2014 | Kurokawa | G02B 6/4225 |
| | | | | 29/832 |
| 2016/0170146 | A1 * | 6/2016 | Kurokawa | G02B 6/4257 |
| | | | | 385/14 |
| 2016/0277116 | A1 | 9/2016 | Hasegawa | |
| 2018/0123697 | A1 * | 5/2018 | Kubota | G02B 19/0009 |
| 2018/0278019 | A1 * | 9/2018 | Yamauchi | H01S 5/02236 |
| 2018/0287705 | A1 * | 10/2018 | Lin | G02B 6/4281 |
| 2020/0328575 | A1 * | 10/2020 | Nakamura | H01S 5/026 |

FOREIGN PATENT DOCUMENTS

JP   2016178218 A   10/2016

* cited by examiner

*Primary Examiner* — Eric Wong
(74) *Attorney, Agent, or Firm* — Harrity & Harrity, LLP

(57) ABSTRACT

An optical subassembly may include a plurality of optical semiconductor devices arrayed such that a plurality of light beams respectively traveling in parallel in a first direction are emitted therefrom or incident thereon. The optical subassembly may also include a carrier on which the plurality of optical semiconductor devices are mounted. Adjacent ones of the plurality of optical semiconductor devices may be located at positions shifted in a second direction orthogonal to the first direction and may be shifted in the first direction so as not to face each other in the second direction.

20 Claims, 4 Drawing Sheets

OPTICAL SUBASSEMBLY

CROSS-REFERENCE TO RELATED APPLICATION

The present application claims priority from Japanese application JP2019-148457 filed on Aug. 13, 2019, the content of which is hereby incorporated by reference into this application.

TECHNICAL FIELD

This relates to an optical subassembly.

BACKGROUND

An optical module (e.g., an optical transceiver) capable of achieving high-speed communication is used in a data center. The optical transceiver may include, as main components, a light emitting function portion (transmitter optical subassembly, TOSA) that converts electricity into light and a light receiving function portion (receiver optical subassembly, ROSA) that, in turn, converts light into electricity.

Due to a recent increase in the amount of information communication, a higher speed of the optical module may be required, to which the optical module responds by achieving multichannel by mounting a plurality of optical semiconductor devices at different oscillation wavelengths on a carrier. On the other hand, for miniaturization of the optical module, miniaturization of the light emitting function portion or the light receiving function portion in the optical module may be required.

A plurality of optical semiconductor devices may be mounted on one submount. However, due to errors such as variations in the manufacture of the optical semiconductor devices and variations in the mounting thereof, narrowing of an interval between the optical semiconductor devices adjacent to each other may be limited, and there may be a limit to the miniaturization.

SUMMARY

According to some possible implementations, an optical subassembly may include a plurality of optical semiconductor devices arrayed such that a plurality of light beams respectively traveling in parallel in a first direction are emitted therefrom or incident thereon; and a carrier on which the plurality of optical semiconductor devices are mounted, wherein adjacent ones of the plurality of optical semiconductor devices are located at positions shifted in a second direction orthogonal to the first direction and also shifted in the first direction so as not to face each other in the second direction.

According to some possible implementations, an optical subassembly may include a plurality of optical semiconductor devices arrayed such that a plurality of light beams respectively traveling in parallel in a first direction are emitted therefrom or incident thereon; and a carrier on which the plurality of optical semiconductor devices are mounted, wherein adjacent ones of the plurality of optical semiconductor devices are located at positions not overlapping as viewed in a second direction orthogonal to the first direction.

DETAILED DESCRIPTION

Figure 1:
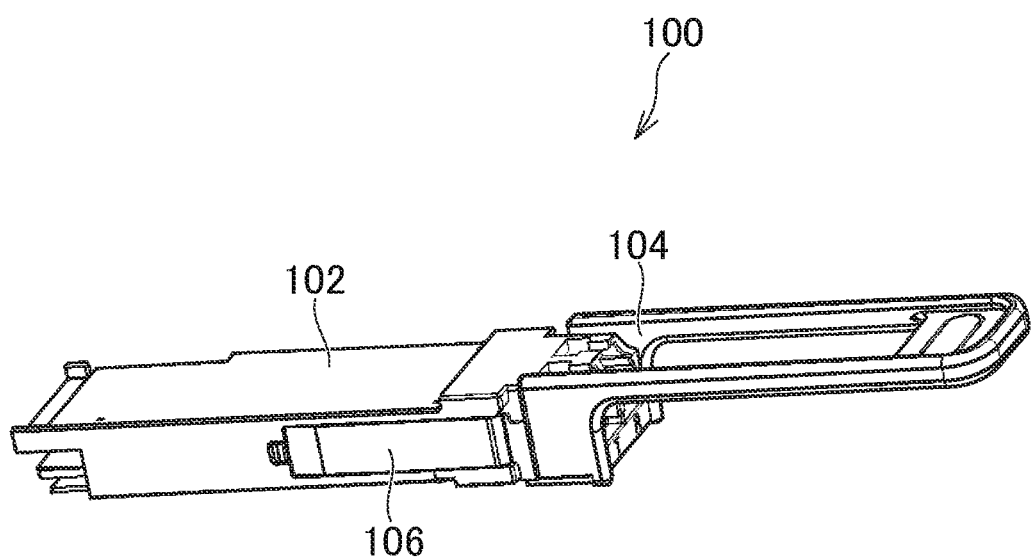
FIG. 1 is a perspective view of an optical module according to an embodiment.

Hereinafter, some embodiments will be described specifically and in detail with reference to drawings. In all the drawings to explain the embodiments, the members with the identical or same function bear the same reference numerals, and their repetitive description will be omitted. The drawings used below are only to explain examples in the embodiments, sizes of figures do not always comply with magnification in the examples.

FIG. 1 is a perspective view of an optical module according to an embodiment. The optical module 100 is an optical transceiver having a transmitting function and a receiving function, and is compliant with the quad small form-factor pluggable 28 (QSFP28) multi-source agreement (MSA) standard. The external shape of the optical module 100 is configured of components including a case 102, a pull tab 104, and a slider 106.

Figure 2:
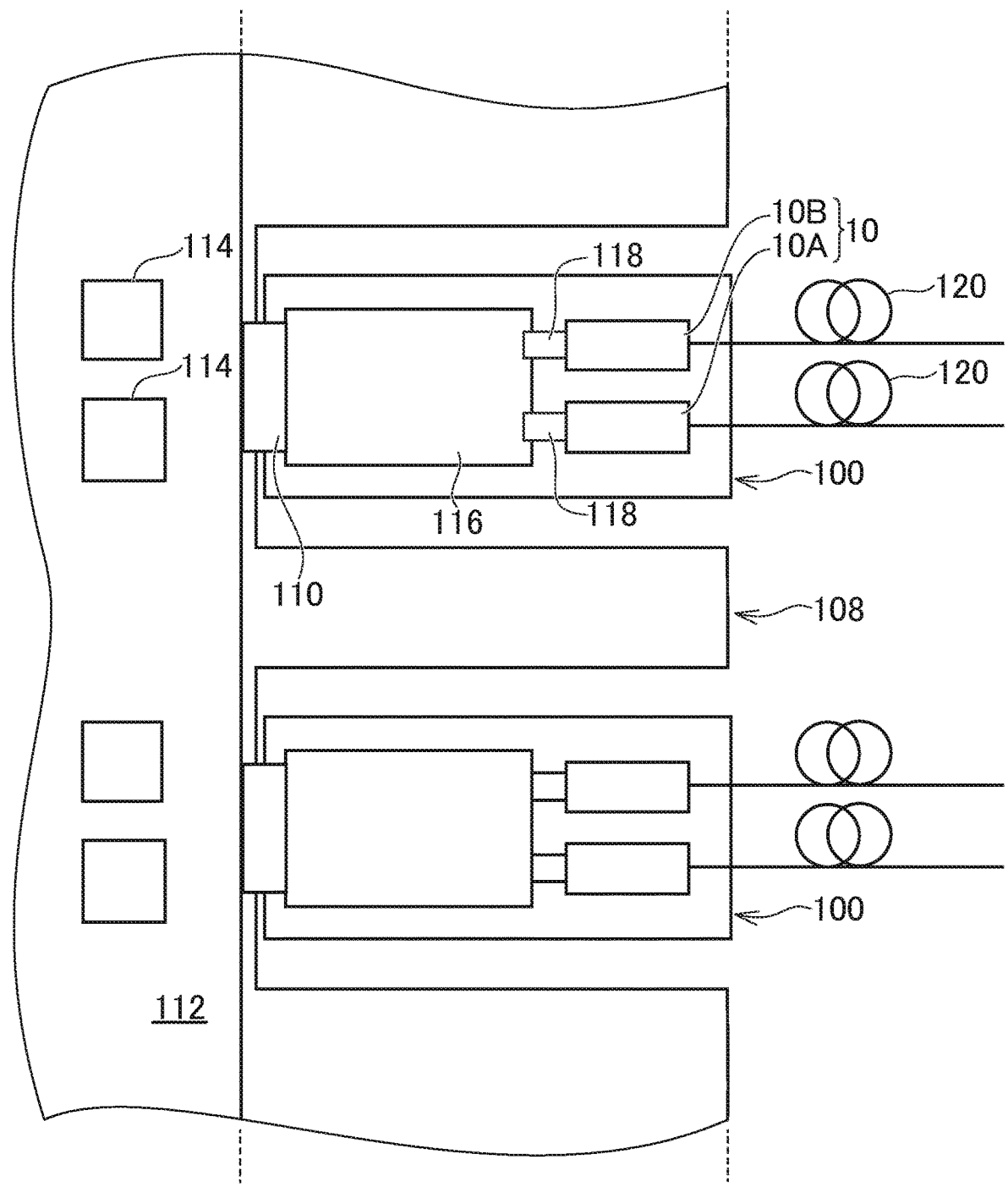
FIG. 2 is a schematic view showing the configuration of an optical transmission apparatus to which the optical module according to the embodiment is attached.

FIG. 2 is a schematic view showing the configuration of an optical transmission apparatus 108 to which the optical module 100 according to the embodiment is attached. A plurality of the optical modules 100 is each attached through an electric connector 110 to the optical transmission apparatus 108. The optical transmission apparatus 108 is, for example, a high-capacity router or switch. The optical transmission apparatus 108 has, for example, the function of an exchange, and is disposed in a base station or the like. The optical transmission apparatus 108 obtains reception data (reception electric signal) with the optical module 100, determines what data to transmit where by using integrated circuit chips 114 or the like mounted on a circuit board 112, generates transmission data (transmission electric signal), and transfers the data to the corresponding optical module 100.

The optical module 100 includes a printed board 116, flexible boards 118, and an optical subassembly 10. The optical subassembly 10 includes a transmitter optical subassembly (TOSA) 10A for converting an electric signal into an optical signal and a receiver optical subassembly (ROSA) 10B for converting an optical signal into an electric signal. An optical conversion element included in the transmitter optical subassembly 10A is a light emitting element that converts an electric signal into an optical signal. An optical conversion element included in the receiver optical subassembly 10B is a light receiving element that converts an optical signal into an electric signal. For inputting/outputting an optical signal, optical fibers 120 are respectively connected to the transmitter optical subassembly 10A and the receiver optical subassembly 10B.

The printed board 116 is an inflexible rigid board. The printed board 116 and each of the transmitter optical subassembly 10A and the receiver optical subassembly 10B are connected via the flexible board 118. An electric signal is transmitted from the printed board 116 to the transmitter optical subassembly 10A via the flexible board 118. Moreover, an electric signal is transmitted from the receiver optical subassembly 10B to the printed board 116 via the flexible board 118.

Figure 3:
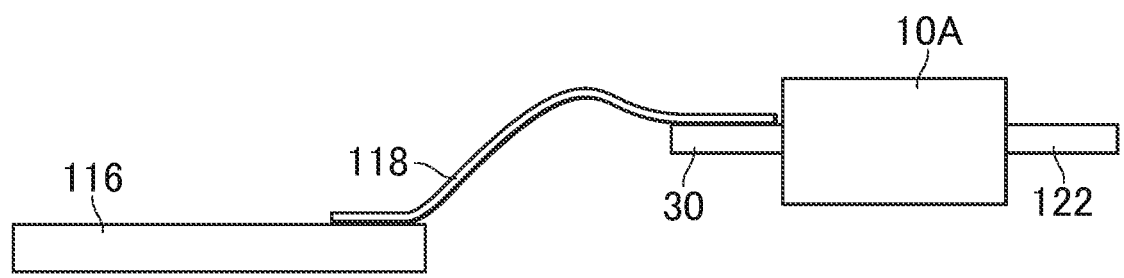
FIG. 3 is a schematic view showing a transmitter optical subassembly, a printed board, and a flexible board.

FIG. 3 is a schematic view showing the transmitter optical subassembly 10A, the printed board 116, and the flexible board 118. The transmitter optical subassembly 10A is connected to one end portion of the flexible board 118. The other end portion of the flexible board 118 overlaps the printed board 116 and is electrically connected thereto.

Figure 4:
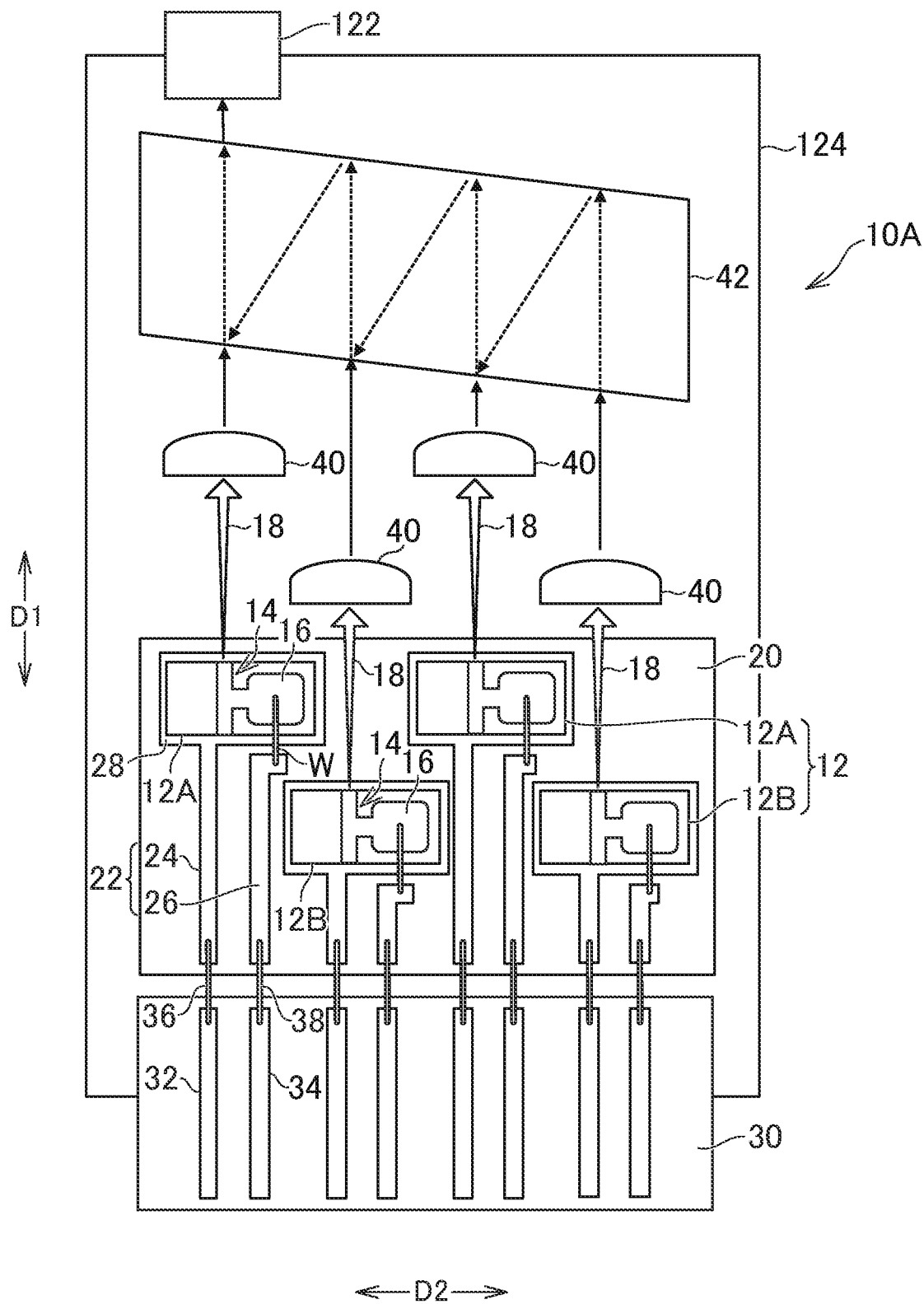
FIG. 4 is a plan view of the interior of an optical subassembly according to an embodiment.

FIG. 4 is a plan view of the interior of the optical subassembly 10 according to an embodiment. Herein, the transmitter optical subassembly 10A will be described.

The transmitter optical subassembly 10A includes a plurality of optical semiconductor devices 12. The optical semiconductor device 12 is a direct modulation-type semiconductor laser device (e.g., a DFB laser). An upper electrode 14 (e.g., a p-electrode) is formed on the upper surface of the optical semiconductor device 12, and a not-shown lower electrode (e.g., an n-electrode) is formed on the rear surface. A portion of the upper electrode 14 is a wide pad electrode 16.

The wavelengths of a plurality of light beams 18 respectively emitted by the plurality of optical semiconductor devices 12 is, for example, a plurality of different wavelengths modulated in amplitude at 25 Gbit/s. In a 1.3 □m band, the wavelengths are, for example, CWDM4 standard wavelengths of 1270, 1290, 1310, and 1330 nm. The wavelengths are not limited to the above, and may be appropriately selected. The plurality of wavelengths is multiplexed by wavelength division multiplexing (WDM), and the TOSA coping with 100 Gbit/s is realized.

The plurality of optical semiconductor devices 12 is arrayed such that the respective light beams 18 are emitted in parallel in a first direction D1. That is, the plurality of optical semiconductor devices 12 is configured such that the emission surfaces of the light beams 18 face in the same direction. The plurality of optical semiconductor devices 12 is arrayed in a staggered manner in a second direction D2 orthogonal to the first direction D1.

The plurality of optical semiconductor devices 12 includes several first optical semiconductor devices 12A arranged in a line in the front row in the second direction D2, and several second optical semiconductor devices 12B arranged in a line in the back row in the second direction D2. The optical semiconductor devices 12 adjacent to each other are configured of a corresponding one of the several first optical semiconductor devices 12A and a corresponding one of the several second optical semiconductor devices 12B.

The first optical semiconductor device 12A and the second optical semiconductor device 12B are arrayed obliquely with respect to any of the first direction D1 and the second direction D2. That is, the optical semiconductor devices 12 adjacent to each other are located at positions shifted in the first direction D1 and also shifted in the second direction D2. In this case, the optical semiconductor devices 12 adjacent to each other do not face each other in the second direction D2. That is, the optical semiconductor devices 12 adjacent to each other are located at positions not overlapping at all as viewed in the second direction D2. On the other hand, the respective edge portions of the optical semiconductor devices 12 adjacent to each other are located at positions facing each other in the first direction D1. That is, as viewed in the first direction D1, the optical semiconductor devices 12 adjacent to each other are located at positions overlapping each other. Hence, the width of the transmitter optical subassembly 10A can be reduced in the second direction D2. That is, the edge surface of the first optical semiconductor device 12A opposite from the emission surface thereof and the emission edge surface of the adjacent second optical semiconductor device 12B are located at positions facing each other in the first direction D1. In this case, emission light of the second optical semiconductor device 12B is disposed at a position not overlapping the first optical semiconductor device 12A. According to the configuration, the width of the transmitter optical subassembly 10A can be narrowed in the second direction D2, and the width of the optical module 100 in which the transmitter optical subassembly 10A is mounted can also be narrowed.

Each of the optical semiconductor devices 12 adjacent to each other is located at a position overlapping another one of the plurality of optical semiconductor devices 12 as viewed in the second direction D2. For example, adjacent to the first optical semiconductor device 12A in the second direction D2, the other first optical semiconductor device 12A is located. Adjacent to the second optical semiconductor device 12B in the second direction D2, the other second optical semiconductor device 12B is located.

The plurality of optical semiconductor devices 12 is mounted on a carrier 20. The carrier 20 is a ceramic board. The carrier 20 includes a plurality of regions in which the plurality of optical semiconductor devices 12 is respectively mounted. A plurality of wiring patterns 22 is formed on the carrier 20. Each of the wiring patterns 22 includes a first wiring line 24 and a second wiring line 26. Any of the wiring patterns 22 has the same interval between the first wiring line 24 and the second wiring line 26. For example, a current signal modulated at 25 Gbit/s is input to the optical semiconductor device 12 via the first wiring line 24 and the second wiring line 26.

The first wiring line 24 includes a pad portion 28 in the region in which the optical semiconductor device 12 is mounted. The lower electrode (not shown) of the optical semiconductor device 12 is electrically and physically connected by solder or the like to one end portion (the pad portion 28) of the first wiring line 24. One end portion of the second wiring line 26 is connected with the upper electrode 14 of the optical semiconductor device 12 through a wire W.

A housing 124 of the transmitter optical subassembly 10A is provided with a feedthrough 30 for connection with the flexible board 118 shown in FIG. 3. The feedthrough 30 includes a plurality of wiring lines 32 and 34. The other end portion of the first wiring line 24 is connected through a wire 36 with the wiring line 32 formed on the feedthrough 30. The other end portion of the second wiring line 26 is connected through a wire 38 with the wiring line 34 formed on the feedthrough 30. An optical fiber connector 122 connected to the optical fibers 120 shown in FIG. 2 is attached to the housing 124.

The housing 124 is provided with a plurality of lenses 40. The plurality of lenses 40 respectively correspond to the plurality of optical semiconductor devices 12, and is disposed such that the plurality of light beams 18 respectively pass through the plurality of lenses 40. The lens 40 is a collimator lens that collimates spread light emitted from the optical semiconductor device 12. The plurality of lenses 40 may be separate or may be integrally formed.

The plurality of optical semiconductor devices 12 are different in oscillation wavelength but have substantially the same structure of an active layer or the like, and have substantially the same emission angle of light. On the other hand, the positions of the emission surfaces (front edge surfaces) of the light beams 18 are different. The second optical semiconductor device 12B in the back row is located behind the first optical semiconductor device 12A in the front row. Therefore, when the plurality of lenses 40 are arranged in a line in the second direction D2, the light beam 18 from the second optical semiconductor device 12B is incident in a more spread state on the lens 40.

Therefore, adjacent ones of the plurality of lenses 40 is located at positions shifted in the first direction D1. The plurality of lenses 40 (lens surfaces) is located at positions spaced by equal distances from the plurality of optical semiconductor devices 12 respectively corresponding thereto. A distance by which adjacent ones of the plurality of optical semiconductor devices 12 is shifted in the first direction D1 and a distance by which adjacent ones of the plurality of lenses 40 is shifted in the first direction D1 are equal.

The plurality of light beams 18 emitted from the lenses 40 are bundled and multiplexed by an output multiplexer (OMUX) 42. The optical semiconductor device 12 may not be limited to a direct modulation-type semiconductor laser but may be an optical semiconductor device 12 integrated with a modulator. Moreover, the above features may be applied to the receiver optical subassembly 10B. In that case, the optical semiconductor device 12 is a light receiving element (e.g., an edge surface incident-type photodiode), and a multiplexed light beam is branched into a plurality of light beams by an input multiplexer (IMUX).

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of")

What is claimed is:

1. An optical subassembly comprising:
   a plurality of optical semiconductor devices arrayed such that a plurality of light beams respectively traveling in parallel in a first direction are emitted therefrom or incident thereon; and
   a carrier on which the plurality of optical semiconductor devices are mounted, wherein adjacent ones of the plurality of optical semiconductor devices are located at positions shifted in a second direction orthogonal to the first direction and also shifted in the first direction so as not to face each other in the second direction,
   wherein each of the plurality of optical semiconductor devices comprises a respective upper electrode, and
   wherein a portion of each respective upper electrode is a wide pad electrode.

2. The optical subassembly according to claim 1, wherein the plurality of optical semiconductor devices are arrayed in a staggered manner in the second direction.

3. The optical subassembly according to claim 1, wherein respective edge portions of the adjacent ones of the plurality of optical semiconductor devices are located at positions facing each other in the first direction.

4. The optical subassembly according to claim 1, wherein
   the plurality of optical semiconductor devices include first optical semiconductor devices arranged in a line in a front row in the second direction and second optical semiconductor devices arranged in a line in a back row in the second direction, and
   the adjacent ones of the plurality of optical semiconductor devices are configured of a corresponding one of the first optical semiconductor devices and a corresponding one of the second optical semiconductor devices.

5. The optical subassembly according to claim 1, further comprising:
   a plurality of lenses that respectively correspond to the plurality of optical semiconductor devices and through which the plurality of light beams respectively pass,
   wherein adjacent ones of the plurality of lenses are located at positions shifted in the first direction.

6. The optical subassembly according to claim 5, wherein the plurality of lenses are located at positions spaced by equal distances from the plurality of optical semiconductor devices respectively corresponding thereto.

7. The optical subassembly according to claim 5, wherein a distance by which the adjacent ones of the plurality of optical semiconductor devices are shifted in the first direction and a distance by which the adjacent ones of the plurality of lenses are shifted in the first direction are equal.

8. An optical subassembly comprising:
   a plurality of optical semiconductor devices arrayed such that a plurality of light beams respectively traveling in parallel in a first direction are emitted therefrom or incident thereon; and
   a carrier on which the plurality of optical semiconductor devices are mounted, wherein adjacent ones of the plurality of optical semiconductor devices are located at positions not overlapping as viewed in a second direction orthogonal to the first direction,
   wherein each of the plurality of optical semiconductor devices comprises a respective upper electrode, and
   wherein a portion of each respective upper electrode is a wide pad electrode.

9. The optical subassembly according to claim 8, wherein each of the adjacent ones of the plurality of optical semiconductor devices is located at a position overlapping another one of the plurality of optical semiconductor devices as viewed in the second direction.

10. The optical subassembly according to claim 8, wherein the plurality of optical semiconductor devices is arrayed in a staggered manner in the second direction.

11. The optical subassembly according to claim 8, wherein respective edge portions of the adjacent ones of the plurality of optical semiconductor devices are located at positions facing each other in the first direction.

12. The optical subassembly according to claim 8, wherein
the plurality of optical semiconductor devices include first optical semiconductor devices arranged in a line in a front row in the second direction and second optical semiconductor devices arranged in a line in a back row in the second direction, and
the adjacent ones of the plurality of optical semiconductor devices are configured of a corresponding one of the first optical semiconductor devices and a corresponding one of the second optical semiconductor devices.

13. The optical subassembly according to claim 8, further comprising:
a plurality of lenses that respectively correspond to the plurality of optical semiconductor devices and through which the plurality of light beams respectively pass,
wherein adjacent ones of the plurality of lenses are located at positions shifted in the first direction.

14. The optical subassembly according to claim 13, wherein the plurality of lenses are located at positions spaced by equal distances from the plurality of optical semiconductor devices respectively corresponding thereto.

15. The optical subassembly according to claim 13, wherein a distance by which the adjacent ones of the plurality of optical semiconductor devices are shifted in the first direction and a distance by which the adjacent ones of the plurality of lenses are shifted in the first direction are equal.

16. An optical transceiver comprising:
a printed board;
a plurality of flexible boards; and
an optical subassembly connected to the printed board via the plurality of flexible boards, the optical subassembly comprising:
a plurality of optical semiconductor devices arrayed such that a plurality of light beams respectively traveling in parallel in a first direction are emitted therefrom or incident thereon; and
a carrier on which the plurality of optical semiconductor devices are mounted,
wherein adjacent ones of the plurality of optical semiconductor devices are located at positions shifted in a second direction orthogonal to the first direction and also shifted in the first direction so as not to face each other in the second direction,
wherein each of the plurality of optical semiconductor devices comprises a respective upper electrode, and
wherein a portion of each respective upper electrode is a wide pad electrode.

17. The optical transceiver according to claim 16, wherein the plurality of optical semiconductor devices are arrayed in a staggered manner in the second direction.

18. The optical transceiver according to claim 16, wherein respective edge portions of the adjacent ones of the plurality of optical semiconductor devices are located at positions facing each other in the first direction.

19. The optical transceiver according to claim 16, wherein
the plurality of optical semiconductor devices include first optical semiconductor devices arranged in a line in a front row in the second direction and second optical semiconductor devices arranged in a line in a back row in the second direction, and
the adjacent ones of the plurality of optical semiconductor devices are configured of a corresponding one of the first optical semiconductor devices and a corresponding one of the second optical semiconductor devices.

20. The optical transceiver according to claim 16, further comprising:
a plurality of lenses that respectively correspond to the plurality of optical semiconductor devices and through which the plurality of light beams respectively pass,
wherein adjacent ones of the plurality of lenses are located at positions shifted in the first direction.

* * * * *